US012620124B2

(12) United States Patent
Chen et al.

(10) Patent No.: US 12,620,124 B2
(45) Date of Patent: May 5, 2026

(54) IMAGE PROCESSING METHOD AND APPARATUS, DEVICE, STORAGE MEDIUM, AND COMPUTER PROGRAM PRODUCT

(71) Applicant: Tencent Technology (Shenzhen) Company Limited, Shenzhen (CN)

(72) Inventors: Fasheng Chen, Shenzhen (CN); Zhiyang Lin, Shenzhen (CN); Lei Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 356 days.

(21) Appl. No.: 18/207,018

(22) Filed: Jun. 7, 2023

(65) Prior Publication Data

US 2023/0342973 A1 Oct. 26, 2023

Related U.S. Application Data

(63) Continuation of application No. PCT/CN2022/121602, filed on Sep. 27, 2022.

(30) Foreign Application Priority Data

Nov. 24, 2021 (CN) .......................... 202111406521.3

(51) Int. Cl.
*G06T 7/73* (2017.01)
*G06T 5/50* (2006.01)
(Continued)

(52) U.S. Cl.
CPC ................. *G06T 7/73* (2017.01); *G06T 5/50* (2013.01); *G06T 7/13* (2017.01); *G06T 7/80* (2017.01);
(Continued)

(58) Field of Classification Search
CPC .... G06T 7/73; G06T 5/50; G06T 7/13; G06T 7/80; G06T 2207/20221;
(Continued)

(56) References Cited

FOREIGN PATENT DOCUMENTS

CN 107230182 A 10/2017
CN 109685913 A 4/2019
(Continued)

OTHER PUBLICATIONS

Thanathorn Phoka et al., "Fine Tuning for Green Screen Matting" Pub. 2017, IEEE (Year: 2017).*
(Continued)

*Primary Examiner* — Mekonen T Bekele

(74) *Attorney, Agent, or Firm* — Morgan, Lewis & Bockius LLP

(57) ABSTRACT

Embodiments of this application provide an image processing method performed by a computer device. The method includes: obtaining an actual image photographed by a camera, the actual image comprising a target object image and a position reference pattern; determining first position information of the position reference pattern in an image coordinate system and second position information of the position reference pattern in a world coordinate system, respectively; determining target pose information of the camera in the world coordinate system based on the first position information, the second position information, and intrinsic information of the camera; and fusing a target object image and a virtual background image in the actual image based on intrinsic information and the pose information to obtain a target image.

17 Claims, 12 Drawing Sheets

(51) Int. Cl.
    *G06T 7/13* (2017.01)
    *G06T 7/80* (2017.01)

(52) U.S. Cl.
    CPC ............... *G06T 2207/20221* (2013.01); *G06T 2207/20224* (2013.01); *G06T 2207/30244* (2013.01)

(58) Field of Classification Search
    CPC . G06T 2207/20224; G06T 2207/30244; G06T 7/11; G06T 2207/30208; G06T 7/194; G06T 11/00; G06T 15/00; G06T 15/005
    See application file for complete search history.

(56) References Cited

FOREIGN PATENT DOCUMENTS

| | | | | | |
|---|---|---|---|---|---|
| CN | 110866978 | A | | 3/2020 | |
| CN | 111126304 | A | | 5/2020 | |
| CN | 111179342 | A | * | 5/2020 | ............. G06F 16/58 |
| CN | 111402143 | A | | 7/2020 | |
| CN | 111479065 | A | | 7/2020 | |
| CN | 111932611 | A | | 11/2020 | |
| CN | 111950521 | A | | 11/2020 | |
| CN | 212231547 | U | | 12/2020 | |
| CN | 112348909 | A | * | 2/2021 | ........... G06T 11/003 |
| CN | 112534804 | A | | 3/2021 | |
| CN | 112702615 | A | | 4/2021 | |
| CN | 113223184 | A | | 8/2021 | |
| CN | 113240615 | A | | 9/2021 | |
| CN | 113643356 | A | * | 11/2021 | ............... G06T 7/85 |
| JP | 5857946 | B2 | * | 2/2016 | ............... G06T 7/85 |
| KR | 100941749 | B1 | | 2/2010 | |
| WO | WO 2021217398 | A1 | | 11/2021 | |

OTHER PUBLICATIONS

Tencent Technology, ISR, PCT/CN2022/121602, Dec. 19, 2022, 2 pgs.
Tencent Technology, WO, PCT/CN2022/121602, Dec. 19, 2022, 4 pgs.
Tencent Technology, IPRP, PCT/CN2022/121602, May 2, 2024, 5 pgs.

* cited by examiner

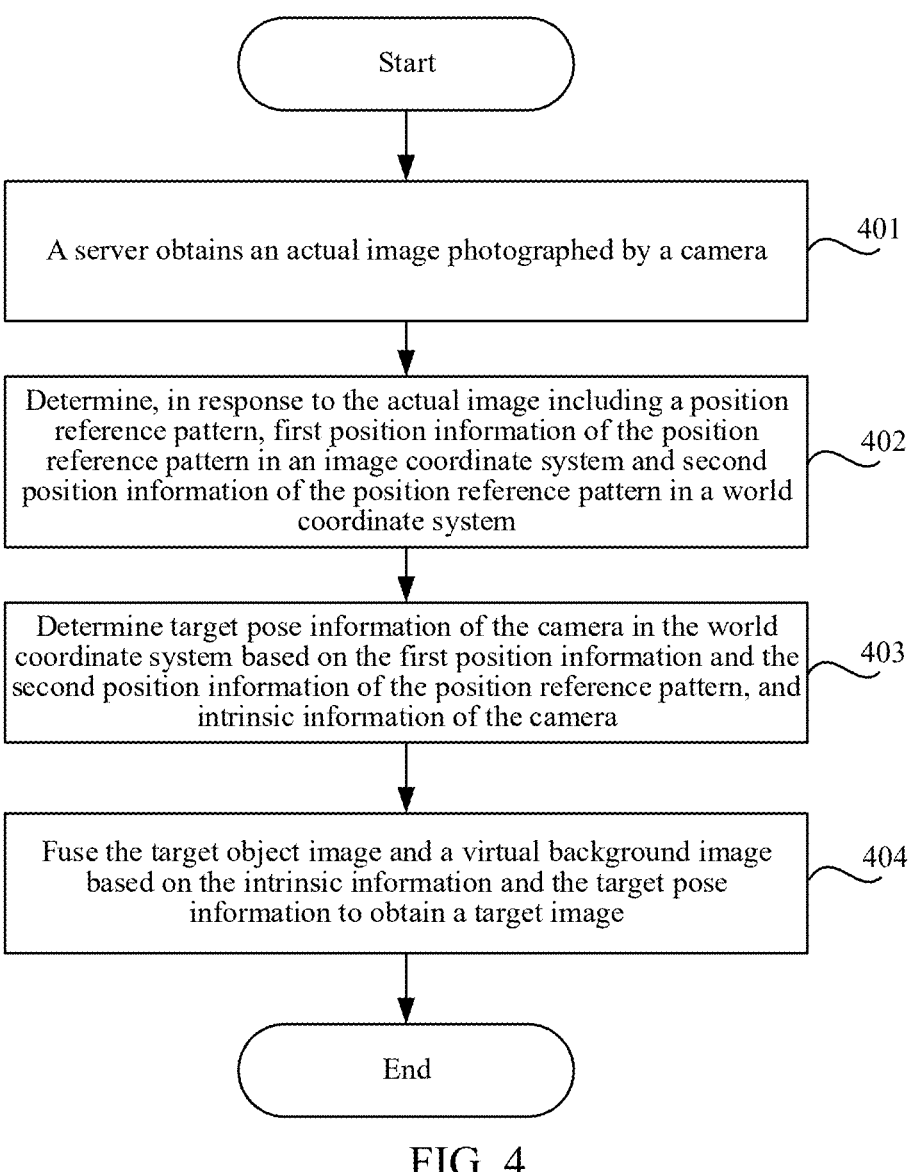

Start

A server obtains an actual image photographed by a camera ⟶ 401

Determine, in response to the actual image including a position reference pattern, first position information of the position reference pattern in an image coordinate system and second position information of the position reference pattern in a world coordinate system ⟶ 402

Determine target pose information of the camera in the world coordinate system based on the first position information and the second position information of the position reference pattern, and intrinsic information of the camera ⟶ 403

Fuse the target object image and a virtual background image based on the intrinsic information and the target pose information to obtain a target image ⟶ 404

End

FIG. 4

IMAGE PROCESSING METHOD AND APPARATUS, DEVICE, STORAGE MEDIUM, AND COMPUTER PROGRAM PRODUCT

CROSS-REFERENCE TO RELATED APPLICATIONS

This application is a continuation application of PCT Patent Application No. PCT/CN2022/121602, entitled "IMAGE PROCESSING METHOD AND APPARATUS, DEVICE, STORAGE MEDIUM, AND COMPUTER PRO-GRAM PRODUCT" filed on Sep. 27, 2022, which claims priority to Chinese Patent Application No. 202111406521.3, entitled "IMAGE PROCESSING METHOD AND APPA-RATUS, DEVICE, STORAGE MEDIUM, AND COM-PUTER PROGRAM PRODUCT" filed on Nov. 24, 2021, all of which is incorporated by reference in its entirety.

FIELD OF THE TECHNOLOGY

Embodiments of this application relate to the field of computer technologies, and in particular, to an image pro-cessing method and apparatus, a device, a storage medium, and a computer program product.

BACKGROUND OF THE DISCLOSURE

A virtual film production technology is to introduce a real object into a virtual scene, and establish an interactive feedback information loop among a virtual world, a real world, and the real object, so as to enhance the sense of reality. The mixed reality technology between reality and virtual has become a frontier practical technology in the fields of exhibition, experience, training, medical treatment, historical site restoration, industrial maintenance, and the like.

In the related art, during virtual film production, a locator is installed on a photographing device to obtain pose infor-mation of the photographing device, the pose information is used for controlling rendering of a virtual scene, and then a subject (person, item, or the like) in a real scene photo-graphed by the photographing device is superimposed on the virtual scene.

However, the virtual scene obtained by the foregoing method often does not match with a real subject, thereby causing rendering errors of a picture, and thus resulting in a poor presentation effect of a video obtained by the virtual film production.

SUMMARY

Embodiments of this application provide an image pro-cessing method and apparatus, a computer device, a com-puter storage medium, and a computer program product, which can improve the accuracy of picture rendering and the rendering effect of a video obtained by virtual film produc-tion.

An embodiment of this application provides an image processing method performed by a computer device. The method includes:

obtaining an actual image photographed by a camera, the actual image comprising a target object image and a position reference pattern;

determining first position information of the position reference pattern in an image coordinate system and second position information of the position reference pattern in a world coordinate system, respectively;

determining target pose information of the camera in the world coordinate system based on the first position information, the second position information, and intrinsic information of the camera; and fusing the target object image and a virtual background image based on the intrinsic information and the target pose information to obtain a target image.

An embodiment of this application provides a computer device, including a memory and a processor.

The memory is configured to store computer programs executed on the processor.

The processor is configured to implement, when execut-ing the computer programs, the image processing method provided in the foregoing embodiment of this application.

An embodiment of this application provides a non-tran-sitory computer-readable storage medium. The computer-readable storage medium stores computer programs execut-able by a computer device. When the computer programs are executed on the computer device, the computer device performs the image processing method provided in the foregoing embodiment of this application.

The embodiments of this application have the following beneficial effects.

In the embodiments of this application, after a actual image photographed by a camera is obtained, target pose information of the camera is determined according to first position information of a position reference pattern in the actual image in an image coordinate system and second position information in a world coordinate system. In this way, since the target pose information of the camera is determined according to the position information of the position reference pattern in different coordinate systems in the image photographed by the device, the photographing of the actual image and the determination of the target pose information are synchronously aligned. Then, a target object image in the actual image and a virtual background image are fused based on intrinsic information and the target pose information, thereby ensuring the accuracy of picture ren-dering, and improving a presentation effect of a video obtained by virtual film production. Furthermore, in the embodiments of this application, pose information can be obtained without a hardware locator, and the problem of synchronization between the hardware locator and a photo-graphing picture can be solved without professional-level camera equipment, thereby reducing the cost of virtual film production, and improving the efficiency of virtual film production.

BRIEF DESCRIPTION OF THE DRAWINGS

FIG. 4 is a schematic flowchart of an image processing method according to an embodiment of this application.

DESCRIPTION OF EMBODIMENTS

Figure 1:
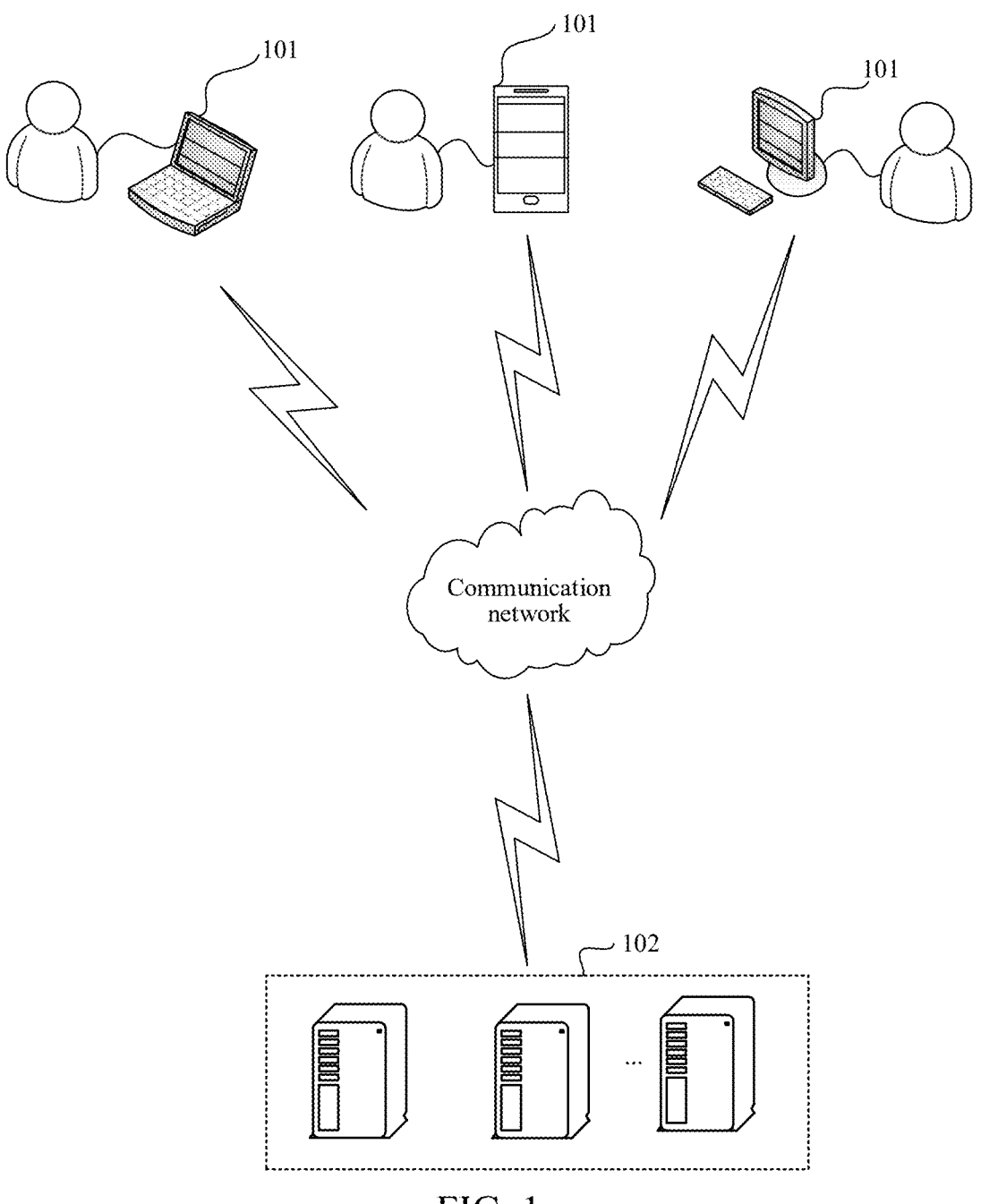
FIG. 1 is a schematic diagram of a system architecture according to an embodiment of this application.

To make the objects, technical solutions, and beneficial effects of the embodiments of this application clearer, the following describes the embodiments of this application in detail with reference to the accompanying drawings and the embodiments. It is to be understood that the embodiments described herein are merely illustrative of this application and are not intended to as be limiting thereof.

In the following description, reference is made to "some embodiments" which describe a subset of all possible embodiments. However, it is to be understood that "some embodiments" may be the same subset or different subsets of all possible embodiments and may be combined with each other without conflict.

To facilitate understanding, the following explains terms involved in the embodiments of this application.

Virtual Film Production: Video film production mode of synthesizing a real subject and a virtual background.

Green Screen/Blue Screen Matting: Matting method using a green or blue screen.

Camera Calibration: In the process of image measurement and machine vision application, in order to determine the relationship between a three-dimensional geometric position of a point on the surface of a space object and a corresponding point thereof in an image, a geometric model of camera imaging must be established. These geometric model parameters are camera parameters. The process of solving the camera parameters is referred to as the camera calibration.

Camera Pose Estimation: Methods for obtaining a camera position, a spatial position, and an attitude angle, commonly including two-dimensional barcode localization, simultaneous localization and mapping (SLAM), radar wave localization, multi-view camera tracking, three-dimensional reconstruction, and the like.

Two-dimensional Barcode: Specific graph capable of obtaining pattern-coded content by scanning.

solvePNP Model: Model for obtaining a pose (such as rotation or offset) of a photographing device in a world coordinate system according to a plurality of known point pairs in OpenCV, where OpenCV is a cross-platform computer vision and machine learning software library.

The design idea of the embodiments of this application is described below.

In the related art, during virtual film production, a locator is installed on a photographing device to obtain pose information of the photographing device, the pose information is used for controlling rendering of a virtual scene, and then a subject (person, item, or the like) in a real scene photographed by the photographing device is superimposed on the virtual scene.

However, the foregoing method is prone to a case where a pose information obtaining time of a locator is not synchronized with a picture photographing time of a photographing device. In this way, a virtual scene and a real subject do not match, thereby causing rendering errors of a picture, and thus resulting in a poor presentation effect of a video obtained by virtual film production.

Through the analysis, it is found that if pose information of the photographing device is determined directly based on a picture in a real scene photographed by the photographing device, the problem of synchronization between the locator and the photographed picture can be effectively solved. In view of this, an embodiment of this application provides an image processing method, which may be implemented by a terminal or a server alone, or by a terminal and a server in cooperation. The method includes the following steps.

A actual image photographed by a camera is obtained, the actual image including a target object image. In response to the actual image including a position reference pattern, first position information of the position reference pattern in an image coordinate system and second position information of the position reference pattern in a world coordinate system are determined. Target pose information of the camera is then determined based on the first position information, the second position information, and intrinsic information of the camera. Then, the target object image and a virtual background image are fused based on the intrinsic information and the target pose information to obtain a target image.

In this embodiment of this application, after a actual image photographed by a camera is obtained, target pose information of the camera is determined according to first position information of a position reference pattern in the actual image in an image coordinate system and second position information in a world coordinate system. In this way, since the target pose information of the camera is determined according to the position information of the position reference pattern in different coordinate systems in the image photographed by the device, the photographing of the actual image and the determination of the target pose information are synchronously aligned. Then, a target object image in the actual image and a virtual background image are fused based on intrinsic information and the target pose information to obtain a target image, thereby ensuring the accuracy of picture rendering, and improving a presentation effect of a video obtained by virtual film production. Furthermore, in this embodiment of this application, pose information can be obtained without a hardware locator, and the problem of synchronization between the hardware locator and a photographing picture can be solved without professional-level camera equipment, thereby reducing the cost of virtual film production, and improving the efficiency of virtual film production.

FIG. 1 shows a diagram of a system architecture applicable to an embodiment of this application. The system architecture includes at least terminal devices 101 and servers 102. There may be one or more terminal devices 101 and one or more servers 102. The number of terminal devices 101 and the number of servers 102 are not limited in this application.

A virtual film production application is pre-installed in the terminal device 101. The virtual film production application is a client application, a web application, a mini program application, or the like. The terminal device 101 may be a smartphone, a tablet computer, a laptop computer, a desktop computer, a smart home appliance, a smart voice interaction device, or a smart car device, but is not limited thereto. The terminal device 101 may have a video photographing function or may be externally connected to a camera.

The server 102 is a background server of the virtual film production application. The server 102 may be an independent physical server, a server cluster or a distributed system composed of a plurality of physical servers, or a cloud server providing basic cloud computing services, such as a cloud service, a cloud database, cloud computing, a cloud function, cloud storage, a network service, cloud communication, a middleware service, a domain name service, a security service, a content delivery network (CDN), and big data and artificial intelligence platforms. The terminal device 101 and the server 102 may be directly or indirectly connected in a wired or wireless communication manner. This embodiment of this application is not limited herein.

The image processing method in this embodiment of this application may be performed by the terminal device 101, may be performed by the server 102, or may be performed by the terminal device 101 and the server 102 in cooperation.

The image processing method in this embodiment of this application is performed by, for example, the server 102. The method includes the following steps.

The terminal device 101 obtains a actual image by photographing. The actual image includes a target object image. The target object image is an image obtained by photographing a target object. The target object may be a person, an item, or the like. Then, the actual image is transmitted to the server 102. The server 102 performs position reference pattern detection on the actual image. If a position reference pattern is detected in the actual image, first position information of the position reference pattern in an image coordinate system and second position information of the position reference pattern in a world coordinate system are determined. Target pose information of the camera is then determined based on the first position information, the second position information, and intrinsic information of the camera. Then, the target object image and a virtual background image are fused based on the intrinsic information and the target pose information to obtain a target image.

Here, there may be one or more (at least two) position reference patterns in the actual image. In the presence of at least two position reference patterns, there are at least two pieces of first position information and at least two pieces of second position information correspondingly. The target pose information of the camera is determined based on the determined at least two pieces of first position information, at least two pieces of second position information and intrinsic information of the camera. The first position information has a one-to-one correspondence with the position reference patterns, and the second position information has a one-to-one correspondence with the position reference patterns.

The server 102 transmits the target image to the terminal device 101, and the terminal device 101 presents the target image in a display interface.

In practical applications, the image processing method in this embodiment of this application may be applied to virtual-real combination scenes such as film and television special effects, virtual livestreaming, game production, and shopping.

Figure 2:
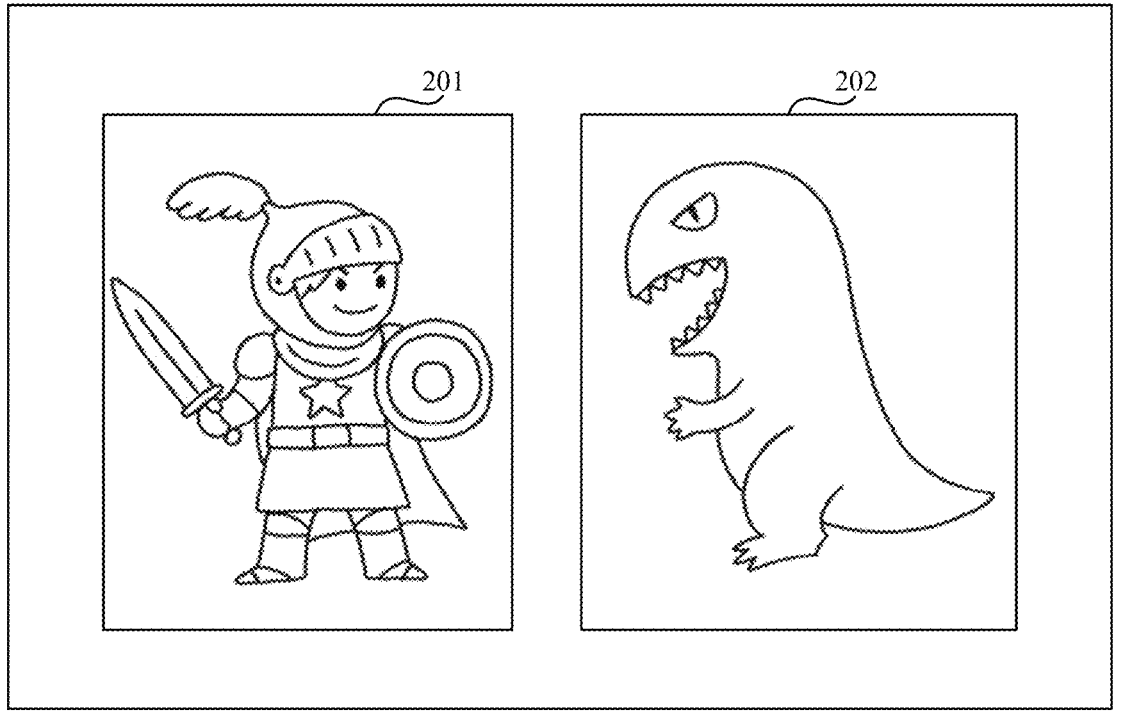
FIG. 2 is a schematic diagram of a film picture according to an embodiment of this application.

In the first application scene, the image processing method in this embodiment of this application may be applied to generate special effects in a film. As shown in FIG. 2, a film picture includes a picture 201 of a real actor and a picture 202 of a virtual scene, whereby the cost and threshold of making the film special effects can be reduced.

Figure 3:
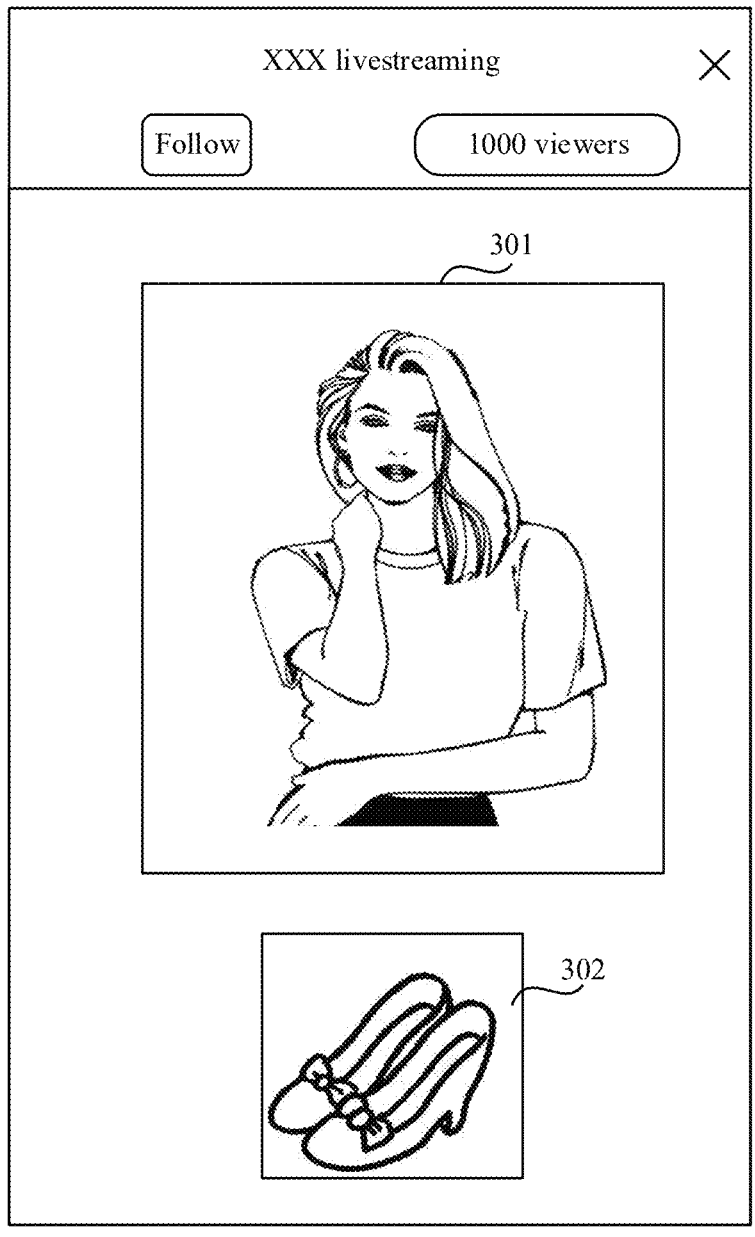
FIG. 3 is a schematic diagram of a live picture according to an embodiment of this application.

In the second application scene, the image processing method in this embodiment of this application may be applied to virtual livestreaming. As shown in FIG. 3, a live picture includes a picture 301 of a real livestreamer and a picture 302 of a virtual product. In practical applications, different virtual products may be switched according to actual requirements, thereby bringing convenience to the livestreamer. In addition, the live picture further includes a virtual scene, and different virtual scenes may be switched according to actual requirements, without redecorating a livestreaming room for each livestreaming theme, thereby improving the livestreaming efficiency, bringing convenience to livestreaming, and greatly reducing the livestreaming cost. In addition, feature effects may also be added to the live picture according to actual requirements, so as to bring a better live picture effect and improve the experience of viewers viewing livestreaming.

Based on the diagram of the system architecture shown in FIG. 1, an embodiment of this application provides a flow of an image processing method. As shown in FIG. 4, the flow of the method is executed by a computer device. The computer device may be at least one of the terminal device 101 or the server 102 shown in FIG. 1. If the computer device implementing the method is a server, the method includes the following steps:

Step S401: The server obtains a actual image photographed by a camera.

In some embodiments, the camera may be a photographing device such as a real camera, a video camera, or a camera, or may be an electronic device having a photographing function (photographing component) such as a mobile phone, a tablet computer, or a smartwatch.

The actual image may be a single image (such as a photograph) obtained by the camera photographing a target object, or a video frame in a to-be-processed video obtained by the camera photographing the target object. In some embodiments, after the camera photographs the to-be-processed video, each video frame in the to-be-processed video may be taken as the actual image to perform subsequent processing. A part of the video frames may be extracted from the to-be-processed video as the actual image to perform subsequent processing. This embodiment of this application is not limited thereto.

In some embodiments, the actual image includes a target object image and a background image. The target object may be a person or an object.

Step S402: Determine, in response to the actual image including a position reference pattern, first position information of the position reference pattern in an image coordinate system and second position information of the position reference pattern in a world coordinate system.

In some embodiments, the server detects the actual image to determine whether the actual image includes a position reference pattern. The position reference pattern is a specific pattern embedded with coded content. The position reference pattern may be a two-dimensional barcode, a mini program code, or the like. The coded content may be a pattern number, a pattern name, or the like of the position reference pattern, which uniquely identifies the position reference pattern.

The actual image may be photographed under a pre-built real scene containing a backdrop (a green screen, a blue screen, or the like). The backdrop contains at least one position reference pattern. When a real scene is built, an arrangement mode of the backdrop in the real scene and a distribution mode of at least one position reference pattern in the backdrop may be set according to actual requirements.

Figure 5:
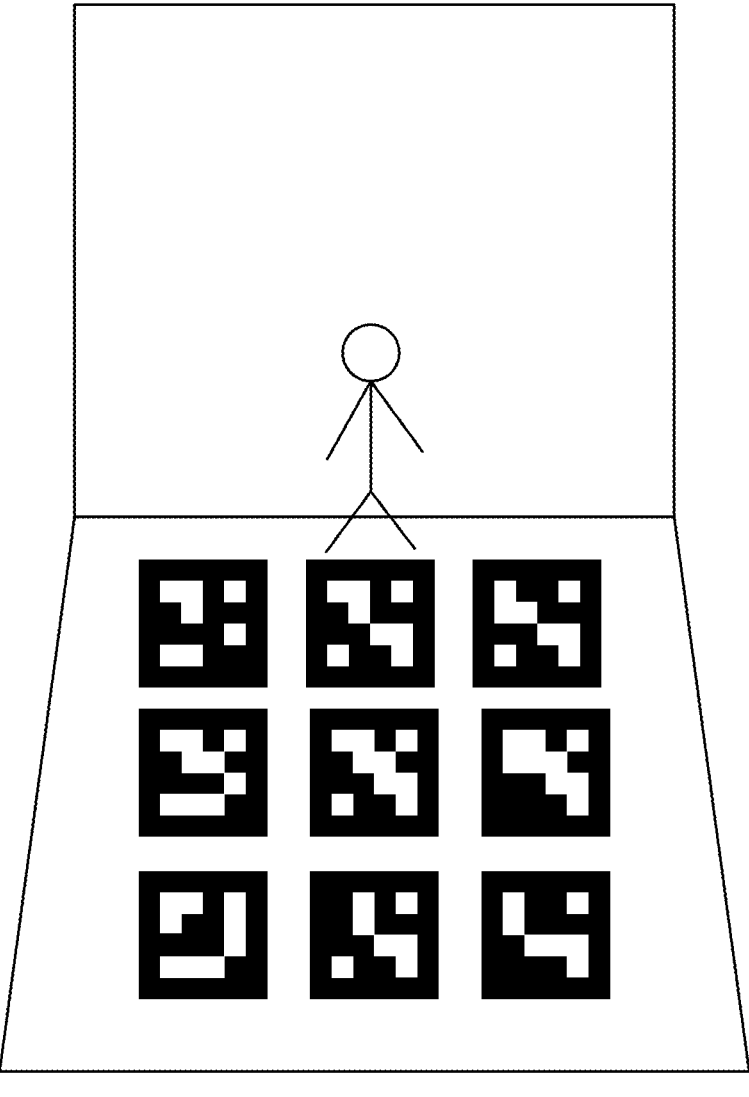
FIG. 5 is a schematic diagram of a green screen laying mode according to an embodiment of this application.

For example, as shown in FIG. 5, the real scene includes two green screens: a blank green screen laid on a wall and a green screen laid on the ground and including 9 two-dimensional barcodes. A real person stands on the green screen including the 9 two-dimensional barcodes.

Figure 6:
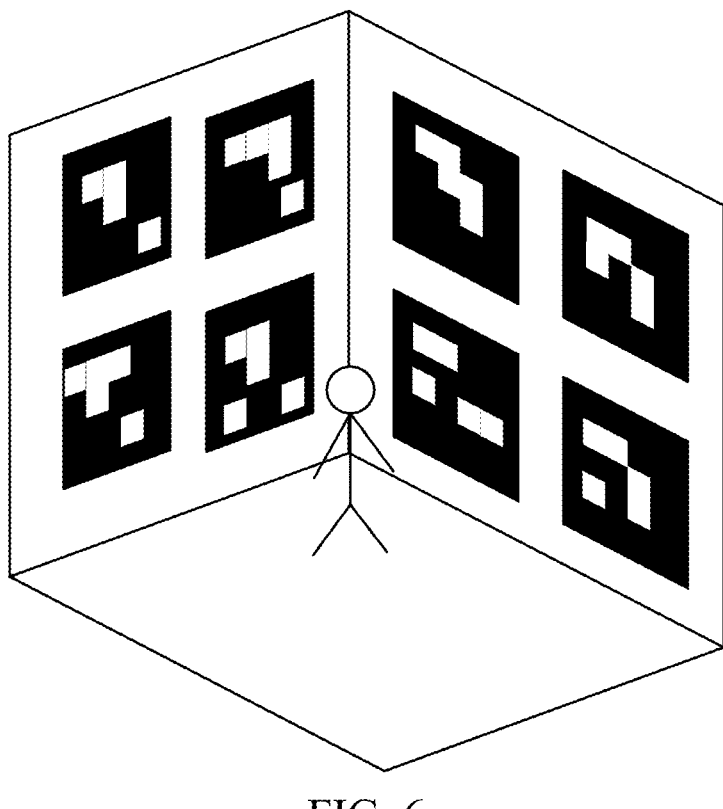
FIG. 6 is a schematic diagram of a green screen laying mode according to an embodiment of this application.

For example, as shown in FIG. 6, the real scene includes three green screens: a blank green screen laid on the ground and green screens laid on two walls and each including 4 two-dimensional barcodes. A real person stands on the blank green screen.

Figure 7:
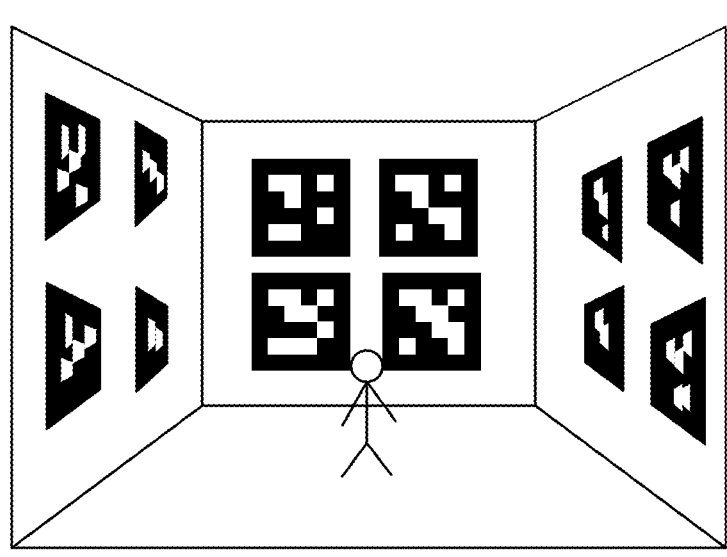
FIG. 7 is a schematic diagram of a green screen laying mode according to an embodiment of this application.

For example, as shown in FIG. 7, the real scene includes four green screens: a blank green screen laid on the ground and green screens laid on three walls and each including 4 two-dimensional barcodes. A real person stands on the blank green screen.

The foregoing exemplary arrangement modes of several backdrops and distribution modes of position reference patterns in the backdrops are merely illustrative. This embodiment of this application is not limited to the exemplary modes.

Step S403: Determine target pose information of the camera based on the first position information and the second position information of the position reference pattern, and intrinsic information of the camera.

In some embodiments, the intrinsic information of the camera is obtained after calibrating the camera. A calibration plate for obtaining feature points in the calibration may be a traditional chessboard calibration plate or a backdrop with a position reference pattern. The intrinsic information may refer to an intrinsic matrix, and distorted images photographed by the camera may be corrected through the intrinsic matrix.

If the camera is a camera, the intrinsic matrix of the camera is:

$$\begin{bmatrix} f_x & 0 & c_x \\ 0 & f_y & c_y \\ 0 & 0 & 1 \end{bmatrix}$$

where $f_x$ and $f_y$ represent focal lengths in x-axis and y-axis directions, and $c_x$ and $c_y$ are coordinates of an optical center in an x-axis and a y-axis.

The target pose information of the camera also refers to extrinsic information of the camera, and may be represented by an attitude matrix. After the target pose information of the camera is obtained, the target pose information may be smoothed using a Kalman filter and debounced, so as to improve the accuracy of the target pose information.

Step S404: Fuse the target object image and a virtual background image based on the intrinsic information and the target pose information to obtain a target image.

In some embodiments, the virtual background image is a pre-generated virtual synthetic picture. The background image in the actual image is removed to obtain a target object image, and then the target object image and the virtual background image are fused to obtain a target image of a target object under a virtual background. Parameters, such as the intrinsic information and the pose information, involved in this embodiment of this application may be stored on a blockchain, and the subsequent description thereof will not be repeated.

In some embodiments, after obtaining the intrinsic information and the target pose information of the camera, the server generates a transaction for storing the intrinsic information and the pose information, and transmits the transaction to a node in a blockchain network, whereby the node in the blockchain network performs a consensus operation on the transaction, and stores the intrinsic information and the target pose information of the camera to the blockchain when the consensus is reached. In this way, the security and anti-tampering of the stored intrinsic information and target pose information of the camera are ensured, and when the server performs the fusion operation on the target object image and the virtual background image again, the intrinsic information and the target pose information of the camera are obtained from the blockchain, and may be directly applied.

In this embodiment of this application, after a actual image photographed by a camera is obtained, target pose information of the camera is determined according to first position information of a position reference pattern in the actual image in an image coordinate system and second position information in a world coordinate system. In this way, since the target pose information of the camera is determined according to the position information of the position reference pattern in different coordinate systems in the image photographed by the device, the photographing of the actual image and the determination of the target pose information are synchronously aligned. Then, a target object image in the actual image and a virtual background image are fused based on intrinsic information and the target pose information, thereby ensuring the accuracy of picture rendering, and improving a presentation effect of a video obtained by virtual film production. Furthermore, in this embodiment of this application, pose information can be obtained without a hardware locator, and the problem of synchronization between the hardware locator and a photographing picture can be solved without professional-level camera equipment, thereby reducing the cost of virtual film production, improving the efficiency of virtual film production, and facilitating the wide application of virtual film production.

In some embodiments, a pattern number is embedded in each position reference pattern, and each position reference pattern includes at least one feature point. The at least one feature point on the position reference pattern is numbered based on the pattern number of the position reference pattern and the position of the at least one feature point on the position reference pattern in the position reference pattern in advance to obtain a feature point number uniquely identifying each feature point.

In the real world, the position of each position reference image on the backdrop is preset, whereby a feature point on each position reference pattern and a second feature point coordinate in the world coordinate system may be known. The second feature point coordinate is a three-dimensional coordinate. In order to facilitate subsequent searching, the pattern number embedded in each position reference pattern is stored corresponding to the feature point number of the feature point on each position reference pattern and the second feature point coordinate. That is to say, the pattern number of the position reference pattern corresponds to the feature point number of the feature point on the position reference pattern. The feature point on the position reference pattern has a mapping relationship with the second feature point coordinate in the world coordinate system. The feature point numbers corresponding to different pattern numbers are different, and the second feature point coordinates corresponding to different pattern numbers are also different. The feature points on the position reference pattern may be preset points, and the feature points on different position reference images have different feature point numbers.

Figure 8:
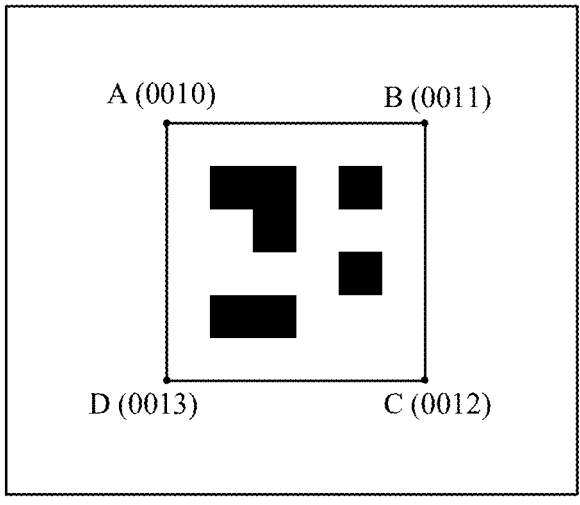
FIG. 8 is a schematic diagram of a position reference pattern according to an embodiment of this application.

For example, the position reference pattern is a two-dimensional barcode. As shown in FIG. 8, a pattern number embedded in the two-dimensional barcode is 001. The two-dimensional barcode includes four feature points: feature point A, feature point B, feature point C, and feature point D. A feature point number of feature point A is 0010, and the second feature point coordinate in the world coordinate system is $(x_{10}, y_{10}, z_{10})$. A feature point number of feature point B is 0011, and the second feature point coordinate in the world coordinate system is $(x_{11}, y_{11}, z_{11})$. A feature point number of feature point C is 0012, and the second feature point coordinate in the world coordinate system is $(x_{12}, y_{12}, z_{12})$. A feature point number of feature point D is 0013, and the second feature point coordinate in the world coordinate system is $(x_{13}, y_{13}, z_{13})$.

After obtaining a actual image photographed by the camera, feature pattern detection is performed on the actual image to obtain a feature point number corresponding to each of a plurality of feature points and a first feature point coordinate in the image coordinate system. The first feature point coordinate is a two-dimensional coordinate. In addition, by decoding the position reference pattern, a pattern number embedded in the position reference pattern may be obtained.

If the number of the plurality of feature points is greater than or equal to the number of feature points contained in one position reference pattern, it is determined that at least one position reference pattern is detected in the actual image. The number of position reference patterns included in the actual image is the same as the number of pattern numbers detected in the actual image. For example, the number of feature points contained in one position reference pattern is a first number. The actual image is detected to obtain a second number of feature points. When the second number is greater than the first number, it is determined that the actual image includes a position reference pattern. The number of pattern numbers embedded in the actual image is obtained, and the number of position reference patterns in the actual image is determined based on the number of pattern numbers. At this moment, the at least one feature point contained in each position reference pattern obtained by detection, the respective feature point numbers, and the first feature point coordinates thereof in the image coordinate system are taken as first position information of the position reference pattern.

If the number of the plurality of feature points is less than the number of feature points contained in one position reference pattern, it is determined that the position reference pattern is not detected in the actual image. Then corresponding historical pose information when the camera photographs the previous actual image is taken as the target pose information.

For example, the position reference pattern is set as a two-dimensional barcode, and one two-dimensional barcode includes four feature points. Two-dimensional barcode detection is performed on the actual image to obtain two pattern numbers and first feature point coordinates of eight feature points in the image coordinate system. The two pattern numbers are respectively: 001 and 002.

The eight feature points are respectively feature point A, feature point B, feature point C, feature point D, feature point E, feature point F, feature point G, and feature point H. Feature point A has a feature point number of 0010, feature point B has a feature point number of 0011, feature point C has a feature point number of 0012, feature point D has a feature point number of 0013, feature point E has a feature point number of 0020, feature point F has a feature point number of 0021, feature point G has a feature point number of 0022, and feature point H has a feature point number of 0023.

Since the number of detected feature points is greater than 4, it is determined that at least one position reference pattern is detected in the actual image. Based on the feature point numbers, feature point A, feature point B, feature point C, and feature point D are feature points on a position reference pattern (having a pattern number of 001), and then the feature point numbers corresponding to feature point A, feature point B, feature point C, and feature point D, and the first feature point coordinates thereof in the image coordinate system are taken as first position information of the position reference pattern.

Feature point E, feature point F, feature point G, and feature point H are feature points on another position reference pattern (having a pattern number of 002), and then the feature point numbers corresponding to feature point E, feature point F, feature point G, and feature point H, and the first feature point coordinates thereof in the image coordinate system are taken as first position information of the another position reference pattern.

This embodiment of this application is not limited to determining whether the number of detected feature points is greater than or equal to the number of feature points contained in one position reference pattern to determine whether a position reference pattern is detected, but may also be other ways. For example, when the number of detected feature points is greater than or equal to the number of feature points contained in one position reference pattern and at least one position reference pattern contained in the detected feature points corresponds to all the feature points, it is determined that at least one position reference pattern is detected in the actual image.

In this embodiment of this application, feature point detection is performed on a actual image, and it is determined whether the actual image includes a position reference pattern based on the number of detected feature points. When the actual image includes the position reference pattern, first position information of the position reference image in an image coordinate system is determined based on first feature point coordinates of the feature points in the position reference pattern in the image coordinate system, and the first position information is used for subsequently determining pose information of a camera, thereby ensuring the real-time performance and accuracy of the obtained pose information. When no position reference pattern is detected, historical pose information corresponding to a previous actual image is used as target pose information, thereby ensuring the continuity of the pose information of the camera.

In some embodiments, based on a pattern number embedded in each position reference pattern in the detected actual image, a feature point number of a feature point in the position reference pattern and a second feature point coordinate of the feature point in the position reference pattern in a world coordinate system are queried. The obtained respective feature point numbers and the corresponding second feature point coordinates are then taken as second position information of the position reference pattern.

In some embodiments, the pattern number embedded in the position reference pattern is obtained by decoding the position reference pattern, and the feature point number of each feature point on the position reference pattern and the second feature point coordinate of each feature point in the world coordinate system are queried based on the pattern number of the position reference pattern.

For example, the position reference pattern is set as a two-dimensional barcode, and one two-dimensional barcode includes four feature points. Two-dimensional barcode detection is performed on the actual image to obtain two pattern numbers and first feature point coordinates of eight feature points in the image coordinate system. The two pattern numbers are respectively: 001 and 002. Based on the pattern number 001, a feature point number 0010 (feature point A), a feature point number 0011 (feature point B), a feature point number 0012 (feature point C), a feature point number 0013 (feature point D), and second feature point coordinates of the feature points corresponding to the feature point numbers in the world coordinate system may be queried.

Based on the pattern number 002, a feature point number 0020 (feature point E), a feature point number 0021 (feature point F), a feature point number 0022 (feature point G), a feature point number 0023 (feature point H), and second feature point coordinates of the feature points corresponding to the feature point numbers in the world coordinate system may be queried.

This embodiment of this application is not limited to querying at least one feature point in the position reference pattern, respective feature point numbers, and second feature point coordinates thereof in the world coordinate system based on the decoded pattern numbers. It is also possible to obtain at least one feature point in the position reference pattern and second feature point coordinates thereof in the world coordinate system, respectively, based on the detected feature point numbers after detecting the position reference pattern. This embodiment of this application is not limited thereto.

In this embodiment of this application, based on a pattern number obtained by decoding from a position reference pattern, a second feature point coordinate of a feature point on the position reference pattern in a world coordinate system is queried, and then the second feature point coordinate of the feature point in the world coordinate system is used for representing the position of the position reference pattern in the world coordinate system, thereby improving the efficiency of obtaining the position of the position reference pattern in the world coordinate system.

In some embodiments, this embodiment of this application determines the target pose information of the camera in at least the following manners:

performing, for at least one position reference pattern, the following steps:

grouping the first feature point coordinate and the second feature point coordinate corresponding to at least one feature point based on the feature point number corresponding to the at least one feature point contained in the position reference pattern to obtain a feature point coordinate pair set corresponding to the position reference pattern, the feature point coordinate pair set including at least one feature point coordinate pair, and the feature point coordinate pair including: one first feature point coordinate and one second feature point coordinate; and determining the target pose information of the camera based on the feature point coordinate pair set corresponding to the at least one position reference pattern and the intrinsic information of the camera.

In some embodiments, a first feature point coordinate and a second feature point coordinate corresponding to the same feature point number are grouped to obtain a feature point coordinate pair, and a plurality of feature point coordinate pairs constitute a feature point coordinate pair set. Then, all the feature point coordinate pairs in the feature point coordinate pair set and the intrinsic information of the camera are inputted into a solvePNP model to obtain the target pose information of the camera.

Figure 9:
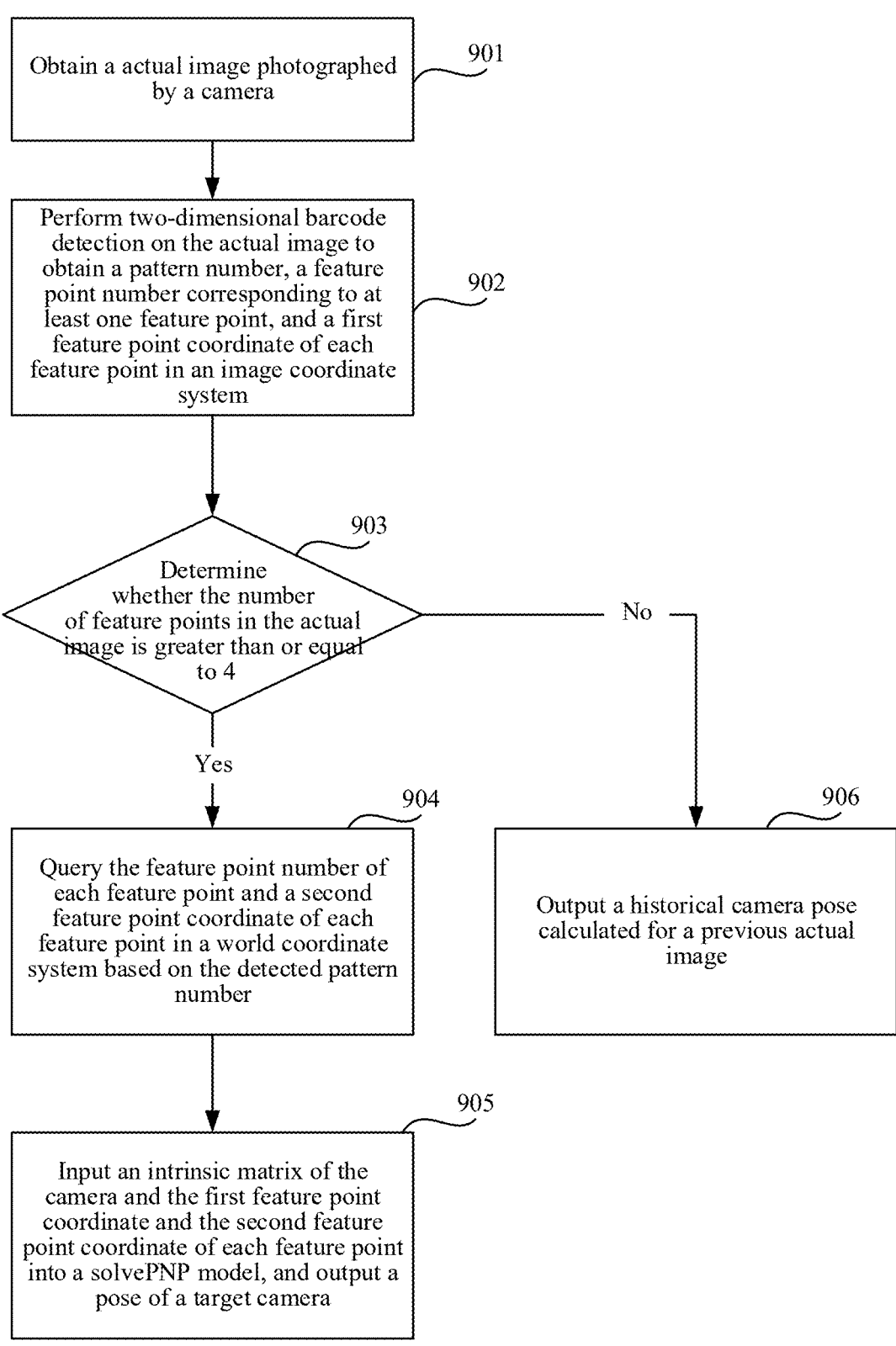
FIG. 9 is a schematic flowchart of a method for determining a camera pose according to an embodiment of this application.

For example, FIG. 9 shows a schematic flowchart of a method for determining a camera pose according to an embodiment of this application. The flow of the method is executed by a computer device. The computer device may be at least one of the terminal device 101 and the server 102 shown in FIG. 1. The method includes the following steps:

Step S901: Obtain a actual image photographed by a camera.

Step S902: Perform two-dimensional barcode detection on the actual image to obtain a pattern number, a feature point number corresponding to at least one feature point, and a first feature point coordinate of each feature point in an image coordinate system.

For example, a pattern number, feature numbers corresponding to four feature points, and first feature point coordinates of the four feature points in the image coordinate system are detected. The pattern number is: 001. The four feature points are feature point A, feature point B, feature point C, and feature point D. A feature point number of feature point A is 0010, and the corresponding first feature point coordinate is $(X_{10}, Y_{10})$. A feature point number of feature point B is 0011, and the corresponding first feature point coordinate is $(X_{11}, Y_{11})$. A feature point number of feature point C is 0012, and the corresponding first feature point coordinate is $(X_{12}, Y_{12})$. A feature point number of feature point D is 0013, and the corresponding first feature point coordinate is $(X_{13}, Y_{13})$.

Step S903: Determine whether the number of feature points in the actual image is greater than or equal to 4, if yes, perform step S904, otherwise, perform step S906.

Step S904: Query the feature point number of each feature point and a second feature point coordinate of each feature point in a world coordinate system based on the detected pattern number.

In some embodiments, based on the detected pattern number, the feature point number corresponding to at least one feature point and second feature point coordinates thereof in the world coordinate system are queried from the pre-stored feature point numbers of all the feature points and the second feature point coordinates in the world coordinate system.

For example, based on a pattern number 001, a feature point number 0010 (feature point A) and a corresponding second feature point coordinate $(x_{10}, y_{10}, z_{10})$, a feature point number 0011 (feature point B) and a corresponding second feature point coordinate $(x_{11}, y_{11}, z_{11})$, a feature point number 0012 (feature point C) and a corresponding second feature point coordinate $(x_{12}, y_{12}, z_{12})$, and a feature point number 0013 (feature point D) and a corresponding second feature point coordinate $(x_{13}, y_{13}, z_{13})$ may be queried.

Step S905: Input an intrinsic matrix of the camera and the first feature point coordinate and the second feature point coordinate of each feature point into a solvePNP model, and output a pose of a target camera.

The first feature point coordinate and the second feature point coordinate are combined based on the feature point number to obtain four feature point coordinate pairs: a feature point coordinate pair $(X_{10}, Y_{10})$-$(x_{10}, y_{10}, z_{10})$, a feature point coordinate pair $(X_{11}, Y_{11})$-$(x_{11}, y_{11}, z_{11})$, a feature point coordinate pair $(X_{12}, Y_{12})$-$(x_{12}, y_{12}, z_{12})$, and a feature point coordinate pair $(X_{13}, Y_{13})$-$(x_{13}, y_{13}, z_{13})$. The four feature point coordinate pairs and the intrinsic matrix of the camera are inputted into the solvePNP model, and the pose of the target camera is outputted.

Step S906: Output a historical camera pose calculated for a previous actual image.

In this embodiment of this application, based on a feature point in a reference pattern, a first feature point coordinate in an image coordinate system and a second feature point coordinate in a world coordinate system, a camera is tracked in real time to obtain pose information of the camera, so as to ensure the synchronization between picture photographing of a real camera and obtaining the pose information, thereby improving the accuracy of the obtained pose information, and further improving the accuracy of subsequent virtual-real rendering.

In some embodiments, when a actual image is obtained by photographing under a real scene containing a backdrop (a green screen, a blue screen, or the like), a background image of the actual image sometimes not only includes a backdrop region, but also includes another interference region outside the backdrop region (for example, an object outside the backdrop is photographed). At this moment, if a traditional matting algorithm is used for removing a backdrop region picture in the actual image, a matting result will include the interference region picture. At this moment, if the matting result is directly synthesized with a virtual background image in a virtual-real manner, a goof phenomenon may be caused for the obtained synthetic image, thereby affecting the presentation effect of the synthetic image.

In view of this, in this embodiment of this application, third position information of a boundary line between a green screen region and a non-green screen region in the background image in the world coordinate system is obtained, and then fourth position information of the boundary line in the image coordinate system is determined based on the third position information, the intrinsic information, and the target pose information. An image of the green screen region in the actual image is removed to obtain a pre-processed image, and an image of the non-green screen region located outside the boundary line in the pre-processed image is removed based on the fourth position information to obtain the target object image.

In some embodiments, the green screen is preset in the real world. Therefore, the third position information of the boundary line of the green screen in the world coordinate system, namely, the third position information of the boundary line between the green screen region and the non-green screen region in the background image in the world coordinate system may be known in advance. In practical applications, the third position information of the boundary line in the world coordinate system may also refer to position coordinates of each boundary point on the boundary line in the world coordinate system.

The third position information of the boundary line in the world coordinate system is converted by using the intrinsic information and the target pose information, and the fourth position information of the boundary line in the image coordinate system is obtained. In practical applications, the fourth position information of the boundary line in the image coordinate system may also refer to position coordinates of each boundary point on the boundary line in the image coordinate system.

The image of the green screen region in the actual image is removed using a matting algorithm to obtain the pre-processed image. Then, the position of the boundary line in the pre-processed image is determined based on the fourth position information, the green screen region located inside the boundary line in the pre-processed image is set to be non-transparent, and the non-green screen region located outside the boundary line in the pre-processed image is set to be fully transparent.

Figure 10:
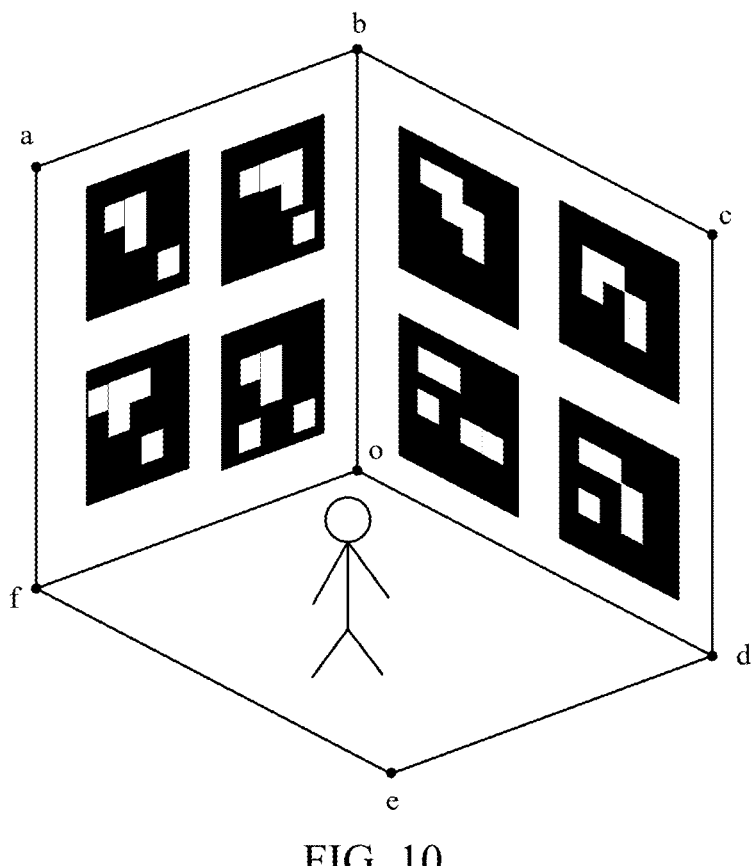
FIG. 10 is a schematic diagram of a green screen boundary line according to an embodiment of this application.

For example, as shown in FIG. 10, in the real world, the boundary line of the green screen includes six boundary points: boundary point a, boundary point b, boundary point c, boundary point d, boundary point e, and boundary point f. An intersection point between two walls and the ground is o, and coordinates of boundary point a, boundary point b, boundary point c, boundary point d, boundary point e, boundary point f, and the intersection point o in the world coordinate system are respectively measured.

The coordinates of the boundary points and the intersection point in the world coordinate system are projected onto two-dimensional coordinates on an imaging plane of the camera, namely, coordinates in the image coordinate system, based on the intrinsic information and the target pose information of the camera.

The image of the green screen region in the actual image is removed using a matting algorithm to obtain the pre-processed image. The pre-processed image is then initialized to a fully zero gray (fully transparent) Mask image. According to the coordinates of each boundary point and the intersection point in the image coordinate system, an abof region (wall), a bcdo region (wall), and an odef region (ground) in the Mask image are filled with a gray level 255 (non-transparent), and another region (non-green screen region outside the boundary line) in the Mask image remains fully transparent, so as to obtain the target object image.

In this embodiment of this application, based on a feature point in a reference pattern, a first feature point coordinate in an image coordinate system and a second feature point coordinate in a world coordinate system, a camera is tracked in real time to obtain real-time pose information of the camera. Then a boundary line of a green screen region in a actual image is predicted in real time based on intrinsic information and the real-time pose information, whereby a non-green screen region in the actual image is cut off completely, thereby ensuring that the picture effect is excellent, stable, robust, and easy to use.

In some embodiments, this embodiment of this application may fuse the target object image and the virtual background image to obtain the target image in the following manner:

determining a field of view of the camera based on the intrinsic information, determining attribute information of a virtual photographing device in a virtual world through a rendering engine based on the intrinsic information, the target pose information, and the field of view, and then determining target position information of a target imaging plane of the target object image in the virtual world based on the attribute information of the virtual photographing device and a reference position point in the target object image; and fusing the target object image and the virtual background image based on the target position information of the target imaging plane to obtain the target image.

In some embodiments, the field of view of the camera is determined based on the intrinsic information using the following formulas (1) and (2):

$$FOV_x = \operatorname{atan}\left(\frac{W}{2f_x}\right) \tag{1}$$

-continued $$FOV_y = \operatorname{atan}\left(\frac{H}{2f_y}\right) \tag{2}$$

where $FOV_x$ represents the field of view in an x-axis direction in the real world, $FOV_x$ represents the field of view in a y-axis direction in the real world, W represents the width of the imaging plane in the image coordinate system in the real world, and H represents the height of the imaging plane in the image coordinate system in the real world.

The intrinsic information, the target pose information, and the field of view are configured into camera parameters in a 3D rendering engine, and the attribute information of the virtual photographing device in the virtual world is determined. The attribute information of the virtual photographing device includes intrinsic information and pose information of the virtual camera in the virtual world.

The reference position point in the target object image may be set according to actual requirements, such as the sole of a foot of a person, namely, the sole of the foot in contact with the ground, or a point on a stool in contact with the ground.

Target position information of a target imaging plane of the target object image in the virtual world is determined based on the attribute information of the virtual photographing device and a reference position point in the target object image. The target position information of the target imaging plane needs to satisfy: When the target object image is displayed in the target imaging plane, a positional relationship between the reference position point in the target object image and the virtual world satisfies a preset condition, so as to ensure that the target object image is displayed at a reasonable position in the virtual world.

In practical applications, the target position information of the target imaging plane may be a distance between the target imaging plane and a virtual focal point of the virtual photographing device, an optical center of the virtual photographing device passes through an optical axis of the virtual world, and the x and y axis directions of the virtual photographing device are the same as the x and y axis directions of the target imaging plane.

In this embodiment of this application, target position information of a target imaging plane of a target object image in a virtual world is determined based on attribute information of a virtual photographing device and a reference position point in the target object image, whereby the accuracy of locating the position of the target object image in the virtual world is improved, thereby effectively improving the presentation effect of an image obtained by virtual-real combination.

In some embodiments, after obtaining the target position information of the target imaging plane, target size information of the target imaging plane is determined based on the attribute information of the virtual photographing device and the target position information of the target imaging plane. The target object image and the virtual background image are then fused based on the target position information and the target size information to obtain the target image.

In some embodiments, a virtual field of view of the virtual photographing device is obtained from the attribute information of the virtual photographing device, and then the target size information of the target imaging plane is determined based on the virtual field of view and the distance between the target imaging plane and the virtual focal point of the virtual photographing device, as shown in the following formulas (3) and (4):

$$w = \tan\left(\frac{fov_x}{2}\right)d \tag{3}$$

$$h = \tan\left(\frac{fov_y}{2}\right)d \tag{4}$$

where $fov_x$ represents the field of view in an x-axis direction in the virtual world, $fov_y$ represents the field of view in a y-axis direction in the virtual world, w represents the width of the target imaging plane in the world coordinate system in the virtual world, and h represents the height of the target imaging plane in the world coordinate system in the virtual world.

Then, based on the target position information and the target size information, the target object image and the virtual background image are rendered in the rendering engine to obtain the target image.

Figure 11:
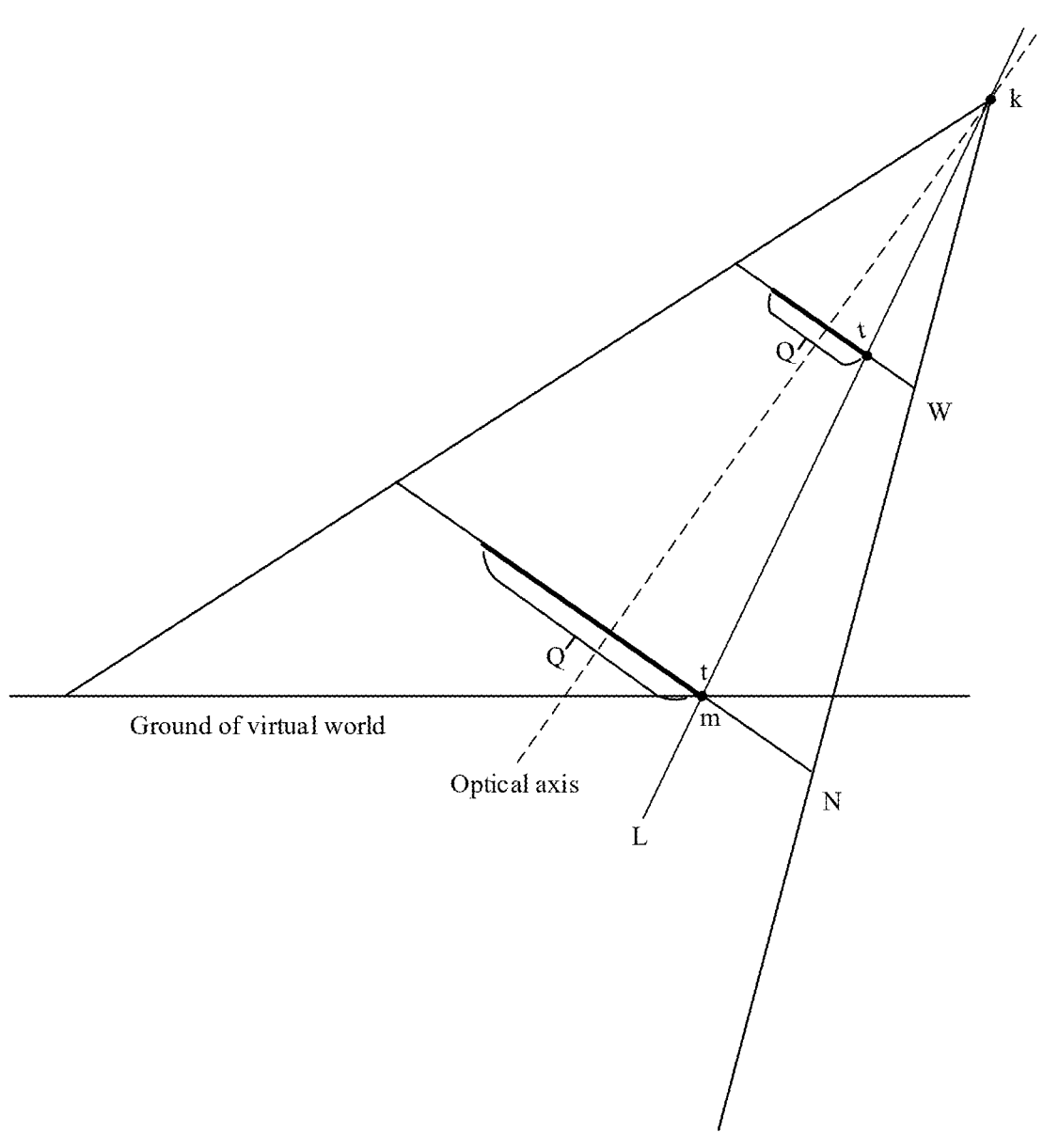
FIG. 11 is a schematic diagram of a target imaging plane according to an embodiment of this application.

For example, as shown in FIG. 11, after the intrinsic information, the target pose information, and the field of view of the real camera are configured into the camera parameters in the 3D rendering engine, the pose information of the virtual camera, the field of view; and the position of a virtual focal point k of the virtual camera in the virtual world may be determined. An initial imaging plane W of a target person image Q in the virtual world and a display size of the target person image Q in the initial imaging plane W may also be obtained. The position of a reference position point t in the initial imaging plane W is determined by using a human skeleton point detection algorithm or traversing the matting result to select the position of the lowest non-transparent coordinate point.

A linear equation L of the virtual focal point k of the virtual camera to the reference position point t is calculated, and then an intersection point m of the linear equation L with the ground of the virtual world is determined. By adjusting a distance between the initial imaging plane W and the virtual focal point k of the virtual camera, the size of the initial imaging plane W is adjusted accordingly. Also, the display size of the target personal image Q in the initial imaging plane W is adjusted in the same proportion until the reference position point t is located at the intersection point m. Then, a distance D between the adjusted reference position point t (namely, the intersection point m) and the virtual focal point k is calculated.

The obtained initial imaging plane W is taken as a target imaging plane N, an included angle $\alpha$ between the linear equation L and the optical axis of the virtual camera is calculated, and d=cos $(\alpha)$*D is taken as a distance between the target imaging plane N and the virtual focal point k of the virtual camera. The obtained distance d is substituted into the formulas (3) and (4), and a width w and a height h of the target imaging plane in the world coordinate system in the virtual world are obtained.

Based on the distance d, the width w, and the height h, the target person image and the virtual background image are rendered in the rendering engine to obtain the target image.

In this embodiment of this application, target position information of a target imaging plane of a target object image in a virtual world is determined based on attribute information of a virtual photographing device and a reference position point in the target object image. Then, target size information of the target imaging plane is correspondingly determined based on the target position information of the target imaging plane, whereby a relationship between the target imaging plane and the virtual world is more matched, thereby improving the accuracy of a picture during the virtual-real combination rendering.

Figure 12:
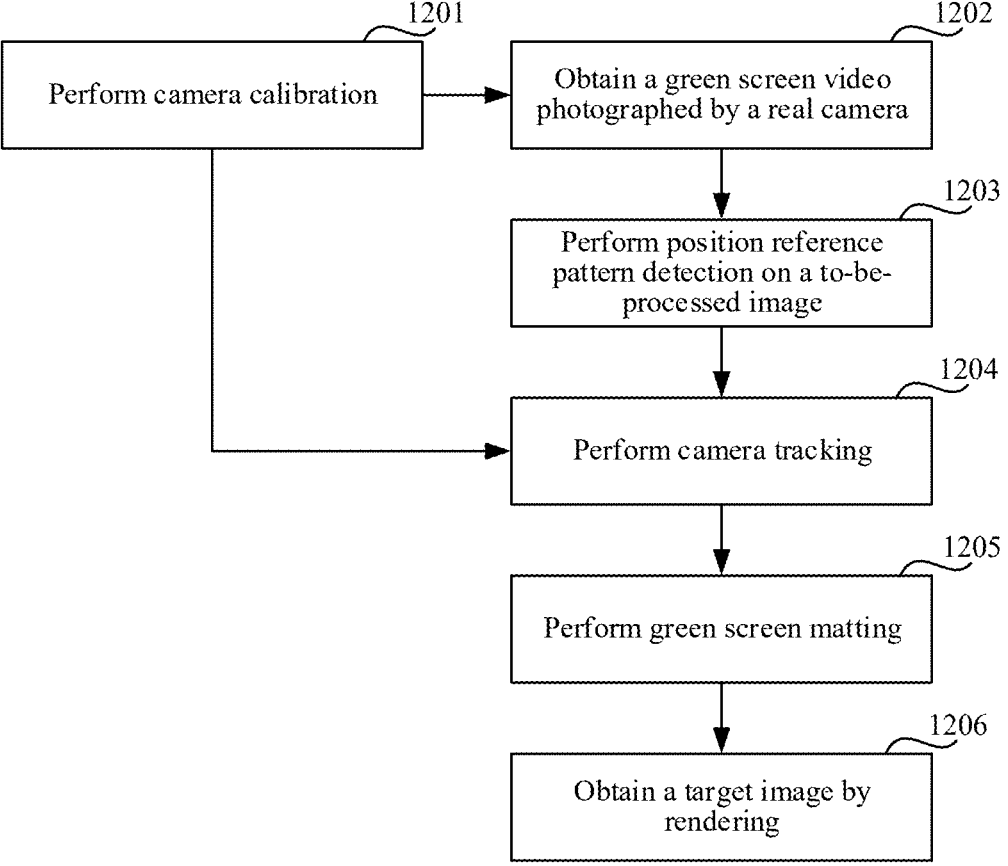
FIG. 12 is a schematic flowchart of an image processing method according to an embodiment of this application.

In order to better explain this embodiment of this application, an image processing method provided by an embodiment of this application is described below in conjunction with an implementation scene. The flow of the method may be executed by a terminal device 101 as shown in FIG. 1, may also be executed by a server 102, and may also be executed by the terminal device 101 and the server 102 in cooperation. The method includes, as shown in FIG. 12, the following steps:

Step S1201: Perform camera calibration.

In some embodiments, camera calibration is performed once offline to obtain intrinsic information of a real camera.

Step S1202: Obtain a green screen video photographed by a real camera.

In some embodiments, a real scene containing a green screen is pre-laid, and the green screen video is photographed by the real camera under the real scene.

Step S1203: Perform position reference pattern detection on each actual image in the green screen video.

In some embodiments, each video frame in the green screen video is taken as the actual image, and feature pattern detection is performed on the actual image to obtain a feature point number corresponding to each of a plurality of feature points and a first feature point coordinate in the image coordinate system. The first feature point coordinate is a two-dimensional coordinate.

Step S1204: Perform camera tracking.

If the number of the plurality of feature points is greater than or equal to the number of feature points contained in one position reference pattern, it is determined that at least one position reference pattern is detected in the actual image.

For each position reference pattern in the detected at least one position reference pattern:

At least one feature point in the position reference pattern, respective feature point numbers, and second feature point coordinates thereof in a world coordinate system are queried based on detected pattern numbers embedded in the position reference pattern.

A first feature point coordinate and a second feature point coordinate corresponding to the same feature point number are grouped to obtain a feature point coordinate pair, and a plurality of feature point coordinate pairs constitute a feature point coordinate pair set. Then, all the feature point coordinate pairs in the feature point coordinate pair set and intrinsic information of the camera are inputted into a solvePNP model to obtain target pose information of the real camera.

If the number of the plurality of feature points is less than the number of feature points contained in one position reference pattern, it is determined that the position reference pattern is not detected in the actual image. Then corresponding historical pose information when the camera photographs a previous actual image is taken as the target pose information.

Step S1205: Perform green screen matting.

Third position information of a boundary line between a green screen region and a non-green screen region in a background image in the world coordinate system is obtained. Fourth position information of the boundary line in an image coordinate system is determined based on the third position information, the intrinsic information, and the target pose information. An image of the green screen region in the actual image is removed using a matting algorithm to obtain a pre-processed image, and an image of the non-green screen region located outside the boundary line in the pre-processed image is removed based on the fourth position information to obtain a target object image.

Step S1206: Obtain a target image by rendering.

After the intrinsic information of the real camera, the target pose information, and a field of view are configured into camera parameters in a 3D rendering engine, attribute information of a virtual photographing device in a virtual world is determined. Target position information of a target imaging plane of the target object image in the virtual world is determined based on the attribute information of the virtual photographing device and a reference position point in the target object image. Target size information of the target imaging plane is then determined based on the attribute information of the virtual photographing device and the target position information of the target imaging plane. The target object image and the virtual background image are then fused based on the target position information and the target size information to obtain the target image.

In this embodiment of this application, after a actual image photographed by a camera is obtained, target pose information of the camera is determined through first position information of a position reference pattern in the actual image in an image coordinate system and second position information in a world coordinate system, whereby photographing of the actual image and obtaining of the target pose information are synchronized and aligned. Therefore, a target object image and a virtual background image in the actual image are fused based on intrinsic information and the target pose information to obtain a target image, thereby ensuring the accuracy of picture rendering, and improving a presentation effect of a video obtained by virtual film production. Furthermore, in this application, pose information can be obtained without a hardware locator, and the problem of synchronization between the hardware locator and a photographing picture can be solved without professional-level camera equipment, thereby reducing the cost of virtual film production, and facilitating the wide application of virtual film production. In addition, the overall solution of this application is very low in algorithm complexity and can be executed in real time using a personal computer, and the pressure of deployment on a cloud is also small, which is very advantageous for large-scale applications.

Figure 13:
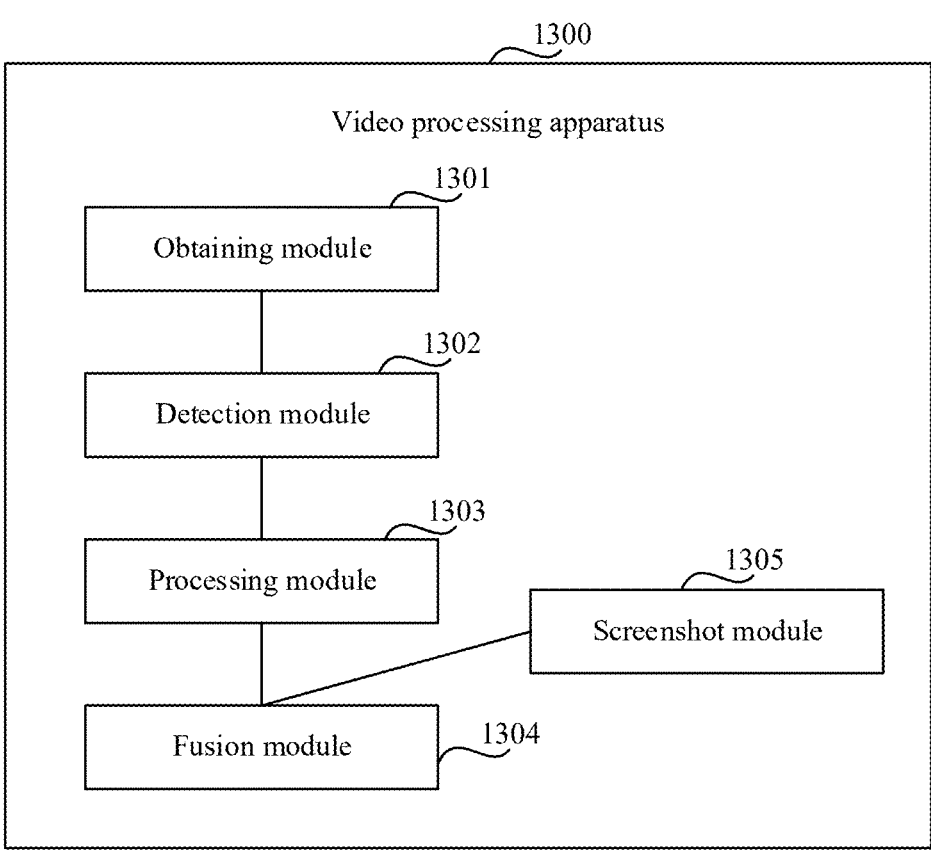
FIG. 13 is a schematic structural diagram of an image processing apparatus according to an embodiment of this application.

Based on the same technical concept, an embodiment of this application provides a schematic structural diagram of an image processing apparatus. As shown in FIG. 13, the apparatus 1300 includes:

an obtaining module 1301, configured to obtain a actual image photographed by a camera, the actual image including a target object image;

a detection module 1302, configured to determine, in response to the actual image including a position reference pattern, first position information of the position reference pattern in an image coordinate system and second position information of the position reference pattern in a world coordinate system;

a processing module 1303, configured to determine target pose information of the camera based on the first position information, the second position information, and intrinsic information of the camera; and a fusion module 1304, configured to fuse the target object image and a virtual background image based on the intrinsic information and the target pose information to obtain a target image.

In some embodiments, the detection module 1302 is further configured to:

obtain, in response to the actual image not including a position reference pattern, historical pose information when the camera photographs a previous actual image, and take the historical pose information as the target pose information.

In some embodiments, the detection module 1302 is configured to:

obtain at least one feature point contained in the position reference pattern, a feature point number of each feature point, and a first feature point coordinate of each feature point in the image coordinate system; and take the obtained at least one feature point, the feature point number, and the first feature point coordinate as the first position information of the position reference pattern.

In some embodiments, the detection module 1302 is configured to:

obtain a pattern number embedded in the position reference pattern;

query a feature point number of each feature point and a second feature point coordinate of each feature point in the world coordinate system based on the pattern number; and take the queried feature point number of each feature point and the second feature point coordinate of each feature point as the second position information of the position reference pattern.

In some embodiments, the processing module 1303 is configured to:

group the first feature point coordinate and the second feature point coordinate of each feature point based on the feature point number of each feature point contained in the position reference pattern to obtain a feature point coordinate pair set corresponding to the position reference pattern, the feature point coordinate pair set including at least one feature point coordinate pair, and the feature point coordinate pair including: one first feature point coordinate and one second feature point coordinate; and determine the target pose information of the camera based on the feature point coordinate pair set corresponding to the position reference pattern and the intrinsic information of the camera.

In some embodiments, the actual image further includes a background image, and the background image includes a green screen region and a non-green screen region. The apparatus further includes a screenshot module 1305.

The screenshot module 1305 is configured to:

obtain, before fusing the target object image and a virtual background image based on the intrinsic information and the target pose information to obtain a target image, third position information of a boundary line between the green screen region and the non-green screen region in the world coordinate system;

determine fourth position information of the boundary line in the image coordinate system based on the third position information, the intrinsic information, and the target pose information;

remove an image of the green screen region in the actual image to obtain a pre-processed image; and remove, based on the fourth position information, an image of the non-green screen region located outside the boundary line in the pre-processed image to obtain the target object image.

In some embodiments, the fusion module 1304 is configured to:

determine a field of view of the camera based on the intrinsic information;

determine attribute information of a virtual photographing device in a virtual world through a rendering engine based on the intrinsic information, the target pose information, and the field of view;

determine target position information of a target imaging plane of the target object image in the virtual world based on the attribute information of the virtual photographing device and a reference position point in the target object image; and fuse the target object image and the virtual background image based on the target position information of the target imaging plane to obtain the target image.

In some embodiments, the fusion module 1304 is configured to:

determine target size information of the target imaging plane based on the attribute information of the virtual photographing device and the target position information of the target imaging plane; and fuse the target object image and the virtual background image based on the target position information and the target size information to obtain the target image.

In this embodiment of this application, after a actual image photographed by a camera is obtained, target pose information of the camera is determined according to first position information of a position reference pattern in the actual image in an image coordinate system and second position information in a world coordinate system. In this way, since the target pose information of the camera is determined according to the position information of the position reference pattern in different coordinate systems in the image photographed by the device, the photographing of the actual image and the determination of the target pose information are synchronously aligned. Then, a target object image in the actual image and a virtual background image are fused based on intrinsic information and the target pose information, thereby ensuring the accuracy of picture rendering, and improving a presentation effect of a video obtained by virtual film production. Furthermore, in this application, pose information can be obtained without a hardware locator, and the problem of synchronization between the hardware locator and a photographing picture can be solved without professional-level camera equipment, thereby reducing the cost of virtual film production, improving the efficiency of virtual film production, and facilitating the wide application of virtual film production. In addition, the overall solution of this application is very low in algorithm complexity and can be executed in real time using a personal computer, and the pressure of deployment on a cloud is also small, which is very advantageous for large-scale applications.

Figure 14:
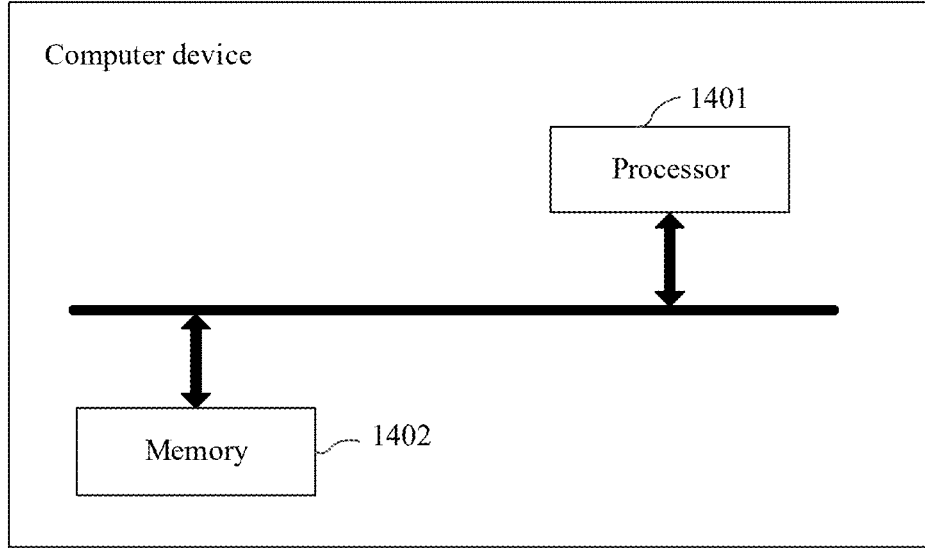
FIG. 14 is a schematic structural diagram of a computer device according to an embodiment of this application.

Based on the same technical concept, an embodiment of this application provides a computer device for implementing an image processing method. The computer device may be at least one of a terminal device and a server as shown in FIG. 1. As shown in FIG. 14, the computer device includes at least one processor 1401 and a memory 1402 connected to the at least one processor. A connection medium between the processor 1401 and the memory 1402 is not limited in this embodiment of this application. In FIG. 14, the processor 1401 and the memory 1402 are connected by, for example, a bus. The bus may be divided into an address bus, a data bus, a control bus, and the like.

In this embodiment of this application, the memory 1402 stores instructions executable by the at least one processor 1401, and the at least one processor 1401 may perform the steps of the foregoing image processing method by executing the instructions stored in the memory 1402.

The processor 1401 is a control center of the computer device, and may be connected to various parts of the computer device by using various interfaces and lines. By operating or executing the instructions stored in the memory 1402 and invoking data stored in the memory 1402, virtual file production is achieved. Optionally, the processor 1401 may include one or more processing units. The processor 1401 may integrate an application processor and a modem processor. The application processor mainly processes an operating system, a user interface, an application, and the like. The modem processor mainly processes wireless communication. It may be understood that the foregoing modem may either not be integrated into the processor 1401. In some embodiments, the processor 1401 and the memory 1402 may be implemented on the same chip. In some other embodiments, the processor and the memory may be separately implemented on an independent chip.

The processor 1401 may be a general purpose processor, for example, a central processing unit (CPU), a digital signal processor, an application specific integrated circuit (ASIC), a field programmable gate array or another programmable logic device, a discrete gate or transistor logic device, or a discrete hardware component, which may implement or perform the methods, steps, and logic block diagrams disclosed in the embodiments of this application. The general purpose processor may be a microprocessor or any conventional processor, or the like. The steps of the methods disclosed with reference to the embodiments of this application may be directly performed and completed by using a hardware processor, or may be performed and completed by using a combination of hardware and software modules in the processor.

The memory 1402 serves as a non-transitory computer-readable storage medium for storing non-volatile software programs, non-volatile computer-executable programs, and modules. The storage unit 1402 may include at least one type of storage medium, for example, a flash memory, a hard disk, a multimedia card, a card type memory, a random access memory (RAM), a static random access memory (SRAM), a programmable read only memory (PROM), a read only memory (ROM), an electrically erasable programmable read-only memory (EEPROM), a magnetic memory, a magnetic disk, an optical disc, and the like. The memory 1402 is any other medium that can be configured to carry or store desired program code in the form of instructions or data structures and can be accessed by a computer device, but is not limited thereto. The memory 1402 in this embodiment of this application may also be a circuit or any other apparatuses capable of performing storage functions for storing program instructions and/or data.

Based on the same inventive concept, an embodiment of this application provides a non-transitory computer-readable storage medium. The computer-readable storage medium stores computer programs executable by a computer device. When the programs are executed on the computer device, the computer device performs the steps of the foregoing image processing method.

Based on the same inventive concept, an embodiment of this application provides a computer program product. The computer program product includes computer programs stored on a computer-readable storage medium. The computer programs include program instructions. When the program instructions are executed by a computer device, the computer device performs the steps of the foregoing image processing method.

A person skilled in the art may understand that the embodiments of this application may be provided as a method, a system, or a computer program product. Therefore, the embodiments of this application may use a form of hardware-only embodiments, software-only embodiments, or embodiments in which software and hardware are combined. Furthermore, the embodiments of this application may use a form of a computer program product that is implemented on one or more computer-usable storage media (including but not limited to a disk memory, a CD-ROM, an optical memory, and the like) that include computer-usable program code.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. Obviously, a person skilled in the art may make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. An image processing method, performed by a computer device, the method comprising:
    obtaining an actual image photographed by a camera, the actual image comprising a target object image and a position reference pattern;
    determining first position information of the position reference pattern in an image coordinate system and second position information of the position reference pattern in a world coordinate system, respectively;
    determining target pose information of the camera in the world coordinate system based on the first position information, the second position information, and intrinsic information of the camera;
    determining a field of view of the camera based on the intrinsic information;
    determining attribute information of a virtual photographing device in a virtual world through a rendering engine based on the intrinsic information, the target pose information of the camera, and the field of view;
    determining target position information of a target imaging plane of the target object image in the virtual world based on the attribute information of the virtual photographing device and a reference position point in the target object image; and
    fusing the target object image and a virtual background image based on the target position information of the target imaging plane to obtain a target image.

2. The method according to claim 1, further comprising:
    in response to the actual image not comprising a position reference pattern, obtaining historical pose information of the camera in the world coordinate system when the camera photographs a previous actual image as the target pose information.

3. The method according to claim 1, wherein the determining first position information of the position reference pattern in an image coordinate system comprises:

obtaining at least one feature point contained in the position reference pattern and a first feature point coordinate of each feature point in the image coordinate system; and taking the obtained at least one feature point and the first feature point coordinate as the first position information of the position reference pattern.

4. The method according to claim 1, wherein the determining second position information of the position reference pattern in a world coordinate system comprises:

obtaining a pattern number embedded in the position reference pattern;

querying a feature point number of each feature point and a second feature point coordinate of each feature point in the world coordinate system based on the pattern number; and taking the queried feature point number of each feature point and the second feature point coordinate of each feature point as the second position information of the position reference pattern.

5. The method according to claim 1, wherein the actual image further comprises a background image, and the background image comprises a green screen region and a non-green screen region; and before the fusing the target object image and a virtual background image based on the target position information of the target imaging plane to obtain the target image, the method further comprises:

obtaining third position information of a boundary line between the green screen region and the non-green screen region in the world coordinate system;

determining fourth position information of the boundary line in the image coordinate system based on the third position information, the intrinsic information, and the target pose information;

removing an image of the green screen region in the actual image to obtain a pre-processed image; and removing, based on the fourth position information, an image of the non-green screen region located outside the boundary line in the pre-processed image to obtain the target object image.

6. The method according to claim 1, wherein the fusing the target object image and the virtual background image based on the target position information of the target imaging plane to obtain the target image comprises:

determining target size information of the target imaging plane based on the attribute information of the virtual photographing device and the target position information of the target imaging plane; and fusing the target object image and the virtual background image based on the target position information and the target size information to obtain the target image.

7. A computer device, comprising a memory and a processor, the memory being configured to store computer programs executed on the processor; and the processor being configured to, when executing the computer programs, cause the computer device to perform an image processing method including:

obtaining an actual image photographed by a camera, the actual image comprising a target object image and a position reference pattern;

determining first position information of the position reference pattern in an image coordinate system and second position information of the position reference pattern in a world coordinate system, respectively;

determining target pose information of the camera in the world coordinate system based on the first position information, the second position information, and intrinsic information of the camera;

determining a field of view of the camera based on the intrinsic information;

determining attribute information of a virtual photographing device in a virtual world through a rendering engine based on the intrinsic information, the target pose information of the camera, and the field of view;

determining target position information of a target imaging plane of the target object image in the virtual world based on the attribute information of the virtual photographing device and a reference position point in the target object image; and fusing the target object image and a virtual background image based on the target position information of the target imaging plane to obtain a target image.

8. The computer device according to claim 7, wherein the method further comprises:

in response to the actual image not comprising a position reference pattern, obtaining historical pose information of the camera in the world coordinate system when the camera photographs a previous actual image as the target pose information.

9. The computer device according to claim 7, wherein the determining first position information of the position reference pattern in an image coordinate system comprises:

obtaining at least one feature point contained in the position reference pattern and a first feature point coordinate of each feature point in the image coordinate system; and taking the obtained at least one feature point and the first feature point coordinate as the first position information of the position reference pattern.

10. The computer device according to claim 7, wherein the determining second position information of the position reference pattern in a world coordinate system comprises:

obtaining a pattern number embedded in the position reference pattern;

querying a feature point number of each feature point and a second feature point coordinate of each feature point in the world coordinate system based on the pattern number; and taking the queried feature point number of each feature point and the second feature point coordinate of each feature point as the second position information of the position reference pattern.

11. The computer device according to claim 7, wherein the actual image further comprises a background image, and the background image comprises a green screen region and a non-green screen region; and before the fusing the target object image and a virtual background image based on the target position information of the target imaging plane to obtain the target image, the method further comprises:

obtaining third position information of a boundary line between the green screen region and the non-green screen region in the world coordinate system;

determining fourth position information of the boundary line in the image coordinate system based on the third position information, the intrinsic information, and the target pose information;

removing an image of the green screen region in the actual image to obtain a pre-processed image; and removing, based on the fourth position information, an image of the non-green screen region located outside the boundary line in the pre-processed image to obtain the target object image.

12. The computer device according to claim 7, wherein the fusing the target object image and the virtual background image based on the target position information of the target imaging plane to obtain the target image comprises:

determining target size information of the target imaging plane based on the attribute information of the virtual photographing device and the target position information of the target imaging plane; and fusing the target object image and the virtual background image based on the target position information and the target size information to obtain the target image.

13. A non-transitory computer-readable storage medium, storing computer programs that, when executed by a processor of a computer device, cause the computer device to perform an image processing method including:

obtaining an actual image photographed by a camera, the actual image comprising a target object image and a position reference pattern;

determining first position information of the position reference pattern in an image coordinate system and second position information of the position reference pattern in a world coordinate system, respectively;

determining target pose information of the camera in the world coordinate system based on the first position information, the second position information, and intrinsic information of the camera;

determining a field of view of the camera based on the intrinsic information;

determining attribute information of a virtual photographing device in a virtual world through a rendering engine based on the intrinsic information, the target pose information of the camera, and the field of view;

determining target position information of a target imaging plane of the target object image in the virtual world based on the attribute information of the virtual photographing device and a reference position point in the target object image; and fusing the target object image and a virtual background image based on the target position information of the target imaging plane to obtain a target image.

14. The non-transitory computer-readable storage medium according to claim 13, wherein the method further comprises:

in response to the actual image not comprising a position reference pattern, obtaining historical pose information of the camera in the world coordinate system when the camera photographs a previous actual image as the target pose information.

15. The non-transitory computer-readable storage medium according to claim 13, wherein the determining first position information of the position reference pattern in an image coordinate system comprises:

obtaining at least one feature point contained in the position reference pattern and a first feature point coordinate of each feature point in the image coordinate system; and taking the obtained at least one feature point and the first feature point coordinate as the first position information of the position reference pattern.

16. The non-transitory computer-readable storage medium according to claim 13, wherein the determining second position information of the position reference pattern in a world coordinate system comprises:

obtaining a pattern number embedded in the position reference pattern;

querying a feature point number of each feature point and a second feature point coordinate of each feature point in the world coordinate system based on the pattern number; and taking the queried feature point number of each feature point and the second feature point coordinate of each feature point as the second position information of the position reference pattern.

17. The non-transitory computer-readable storage medium according to claim 13, wherein the actual image further comprises a background image, and the background image comprises a green screen region and a non-green screen region; and before the fusing the target object image and a virtual background image based on the target position information of the target imaging plane to obtain the target image, the method further comprises:

obtaining third position information of a boundary line between the green screen region and the non-green screen region in the world coordinate system;

determining fourth position information of the boundary line in the image coordinate system based on the third position information, the intrinsic information, and the target pose information;

removing an image of the green screen region in the actual image to obtain a pre-processed image; and removing, based on the fourth position information, an image of the non-green screen region located outside the boundary line in the pre-processed image to obtain the target object image.

* * * * *